United States Patent
Ball (10) Patent No.: US 10,553,000 B2
(45) Date of Patent: *Feb. 4, 2020

(54) ANALYTICS VISUALIZATION

(71) Applicant: Salesforce.com, Inc., San Francisco, CA (US)

(72) Inventor: Luke Ball, Berkeley, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/003,684

(22) Filed: Jun. 8, 2018

(65) Prior Publication Data

US 2019/0043229 A1 Feb. 7, 2019

Related U.S. Application Data

(63) Continuation of application No. 14/837,241, filed on Aug. 27, 2015, now Pat. No. 9,996,955.

(60) Provisional application No. 62/054,108, filed on Sep. 23, 2014.

(51) Int. Cl.
G06T 11/20 (2006.01)
G06Q 10/00 (2012.01)

(52) U.S. Cl.
CPC ............ G06T 11/206 (2013.01); G06Q 10/00 (2013.01)

(58) Field of Classification Search
CPC .................................................. G06T 11/206
See application file for complete search history.

(56) References Cited

U.S. PATENT DOCUMENTS

| | | | |
|---|---|---|---|
| 5,894,311 A | 4/1999 | Jackson | |
| 6,384,847 B1 | 5/2002 | Rabenhorst | |
| 7,800,613 B2 | 9/2010 | Hanrahan | |
| 7,961,188 B2 | 6/2011 | Tolle | |
| 2004/0095349 A1 | 5/2004 | Bito | |
| 2004/0196286 A1* | 10/2004 | Guzik | G06T 11/206 345/440 |
| 2004/0201588 A1 | 10/2004 | Meanor | |
| 2005/0206644 A1 | 9/2005 | Kincaid | |
| 2006/0028470 A1 | 2/2006 | Bennett | |
| 2007/0126736 A1 | 6/2007 | Tolle | |
| 2008/0158257 A1 | 7/2008 | Bobrow | |
| 2010/0118049 A1 | 5/2010 | Bobrow | |
| 2012/0154403 A1 | 6/2012 | Mital | |
| 2012/0200567 A1 | 8/2012 | Mandel | |
| 2012/0229466 A1 | 9/2012 | Riche | |
| 2013/0249917 A1 | 9/2013 | Fanning | |

* cited by examiner

Primary Examiner — Ryan R Yang
(74) Attorney, Agent, or Firm — Morris & Kamlay LLP (57) ABSTRACT

Systems, device and techniques are disclosed for analytics visualization. A selection of a data set may be received. A first visualization associated with the data set may be generated. A selection of a first data subset of the data set may be received. A second visualization associated with the first data subset of the data set may be generated. The second visualization may be visually linked to the first visualization with a first visual link. A selection of a second data subset of the data set may be received. A third visualization associated with the second data subset of the data set may be generated. The third visualization may be visually linked to the first visualization with a second visual link and displayed simultaneously with the second visualization.

17 Claims, 6 Drawing Sheets

ANALYTICS VISUALIZATION

PRIORITY

This application claims the benefit of U.S. Provisional Application No. 62/054,108, filed Sep. 23, 2014, the disclosure of which is incorporated by reference in its entirety.

BACKGROUND

Data relevant to a company, such as social networking data, may be gathered from the Internet. The data may include mentions of the company and its products gathered from social networking services. A data set from the gathered data may be displayed visually, allowing for analysis of the data, and segmentation of the data into further subsets to aid in the analysis. This may allow a company to monitor how the company, its products, and its competitors are viewed through social media postings.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Techniques disclosed herein enable analytics visualization, which may be used to present a user, for example, from a company using a customer relationship management tool, with visualizations of data, such as data gathered from social networking services The techniques include a data explorer, or data visualizer, that may be used to visualize and analyze data from social media postings about a company. The analyzed data may be presented to the user, for example, from the company, using the data visualizer. The data visualizer may be used to view visualizations of the data, and to explore the data, dividing the data into data subsets and viewing visualizations based on data subsets. A visual indication, or visual link, may be presented by the data visualizer to indicate how different data subsets are related. This may allow a user to be aware of their path through a data set and its data subsets, allowing the user to retrace their steps and understand the relationship between different data subsets and visualizations. The techniques disclosed herein enhance analytics visualization by making it easier for a company to analyze data gathered from social networking services.

A data systems, such as customer relationship management (CRM) systems, Social Media Management systems, and other systems used for data analysis, may gather data from social networking services or for from other suitable Internet sources. The gathered data may include, for example, social media postings that mention, for example, the name of the company using the data system, the products of that company, the name of the company's competitors, or the company's competitor's products. Time, date, region of origin, and other suitable data may also be gathered from social media postings along with the content of the postings themselves. The gathered data may be collected in a data set and stored in a database.

The data set may be presented to a user using an explore mode of the data system. The explore mode may include a user interface that may allow for open-ended data exploration and infinite drill-down and segmentation of data, while making it easier for a user to track and visualize their path through the data. For example, the data system may include an analytics host server which may include a data analyzer and a data visualizer. A user, using a user device which may be any suitable computing device, such a smartphone, tablet, or laptop, may access the analytics host server and view visualizations of the data set presented by the data visualizer. The data visualizer may present, in the user interface of the explore mode, suitable visualizations, or cards, for the data set, such as, for example, pie charts, line graphs, bar graphs, and any other suitable charts, graphs, or listings.

The user may be able to segment the data set into data subsets for further analysis. The user may, for example, apply various filter to the data set in order to create a visualization for that data subset. For example, the data set may include all of the data gathered from social media services over the past year that mention a company or any of the company's competitors. The user may wish create a visualization, such as a pie chart, to compare the number of mentions of the company and the company's three biggest competitors during the first quarter of the year. The user may apply the appropriate filters, resulting in a data subset including the desired data from the data set. The data subset may be displayed to the user with an appropriate visualization, for example, a pie chart, that may be selected automatically or may be selected by the user. A visual link may be displayed between the visualization for the data set, which may be the parent, and the visualization for the data subset, which may be the child. Further data subsets and associated visualizations may be created as the user selects additional data subsets of either the original data set or already created data subsets. Visual links may be used to link each parent and child visualization. This may allow a user to dig deeper into data while still being able to retrace their steps, as they can follow the visual links to determine all of the parent data subsets and visualizations back to the original data set for a particular child visualization, and all of the child visualizations for a particular parent visualization, starting at the original data set. This may allow user to resolve questions about the data subset used for a visualization by examining the data used in that visualization's parent visualization.

Changes made to the data subset for a parent visualization may filter down to the children visualization of that parent.

For example, a parent visualization may be a pie chart depicting social media posting mentions for a company and three of its competitors. A child visualization may be a bar graph depicting social media posting mentions for the three competitors. Removing one of the competitors from the parent visualization may result in that competitor being removed from the child visualization as well, for example, being taken out of the bar graph. Changes may propagate dynamically between parent visualizations and children visualizations. For example, a change made to a data subset of a parent visualization may change the parent visualization, and may result in a corresponding dynamic changes in any children visualizations of the parent visualizations. The changes to the children visualizations may have their own children visualizations, to which the changes may be propagated dynamically. In this way, all related visualizations may reflect the data subsets of their parent visualizations.

The data visualizer may organize the visualizations of data subsets based on a tree view. For example, two separate child visualizations of a parent visualization may be presented in separate rows, or branches of the tree view. This may make it easier for a user to follow visual links between the visualizations of the various subsets of data. A branch may be cloned in order to open multiple branches. When the user interface has become crowded with visualizations, some of the visualizations may be collapsed, so as to take up less room and allow, for example, a last generation child visualization to appear on the user interface. The visual links may remain intact even for collapsed visualizations so that the user may still follow them.

Figure 1:
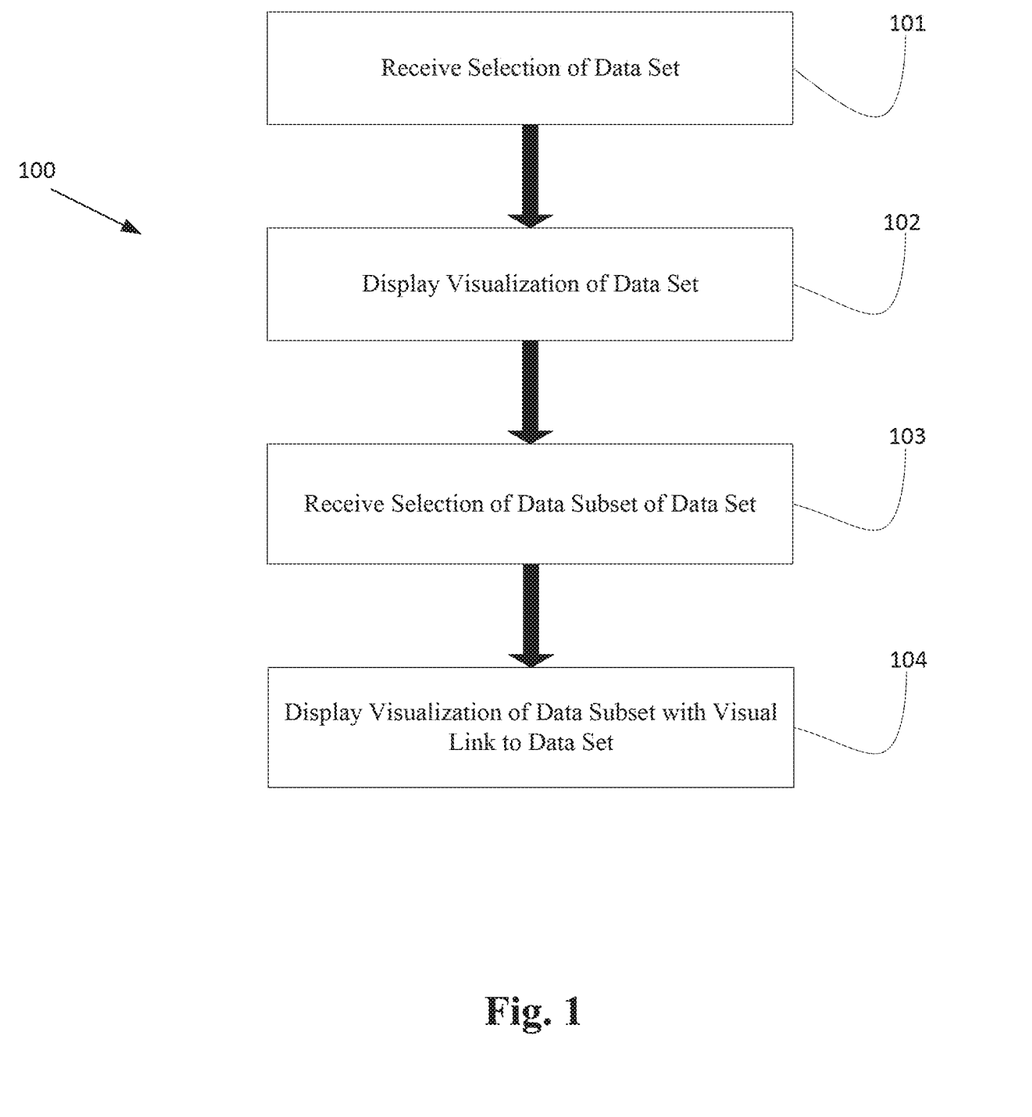
FIG. 1 shows an example process for analytics visualization according to an implementation of the disclosed subject matter.

According to implementations of the disclosed subject matter, as shown in FIG. 1, an analytics visualization may be presented to a user. As shown at step 101, a data set may be selected. At step 102, a visualization of the data set may be displayed. At step 103, a selection of a data subset of the data set may be received. At step 104, a visualization of the data subset may be displayed with a visual link to the data set.

According to implementations of the disclosed subject matter, at step 101 in FIG. 1, a data set may be selected. For example, a database of social media posts gathered from social networking services may be accessible to an analytics host server, which may be part of a CRM system used by a company. A user from the company, using a user device, may be able to select a data set from the database through the analytics host server. The user may select a data set that includes the totality of data stored in the database. The user may also choose a narrower data set by, for example, applying filters to the entirety of the data in the database. For example, the user may select a data set that includes social media mentions of the user's company and three of its competitors made during the last year.

According to implementations of the disclosed subject matter, at step 102, a visualization of the data set may be displayed. For example, the analytics host server may include a data visualizer, which may display, on the user device, a visualization for the data set selected by the user. The visualization may be presented in a user interface of an explore mode of the data system, for example, as a card. The visualization may be, for example, a listing of the total data size of the data set selected by the user. The visualization may also include the criteria, or filters, that were used to create the data set from the totality of data stored in the database, if the data set does not include totality of the data.

According to implementations of the disclosed subject matter, at step 103, a selection of a data subset of the data set may be received. The user, using the user device, may select a subset of the previously selected data set. For example, the user may apply filters to the data set in order to select data from the data set that is of interest to the user. A data analyzer on the analytics host server may apply the filters to the data set, resulting in a data subset. For example, the user may filter a data set including social media postings that mention the user's company and all of its competitor companies over the past year down to a data subset of social media postings that mention the user's company and three of its competitors over the first quarter of the year.

According to implementations of the disclosed subject matter, at step 104, a visualization of the data subset may be displayed with a visual link to the data set. For example, the data visualizer may display to the user, on the user device, a visualization of the data subset selected by the user. The visualization may be any suitable visualization, such as a bar chart, pie chart or graph, and may include a visualizations of filters that were applied to the data set to create the data subset. The data visualizer may also display, on the user device, a visual link between the visualization for the data set and the visualization for the data subset. The visual link may be, for example, an arrow directed from the visualization for the data set to the visualization for the data subset. The visual link may be an active or passive element of the user interface of the explore mode of the data system. For example, the visual link may be clickable, which may highlight or un-highlight the visualizations for the data set and data subset connected by the visual link, or expand a connected visualization that has been hidden. The data subset, and visualization thereof, may be a child of the data set and visualization thereof, which may be the parent.

The steps 103 and 104 may be repeated, using either the original data set or a data subset as a parent, to create additional child data subsets and visualizations. Every child visualization may be visually linked to its parent visualization when displayed in the user interface on the user device. Creating a second child data subset and visualization for a parent that already has a first data subset and visualization may result in the second visualization being displayed in a second branch of the tree view.

Figure 2:
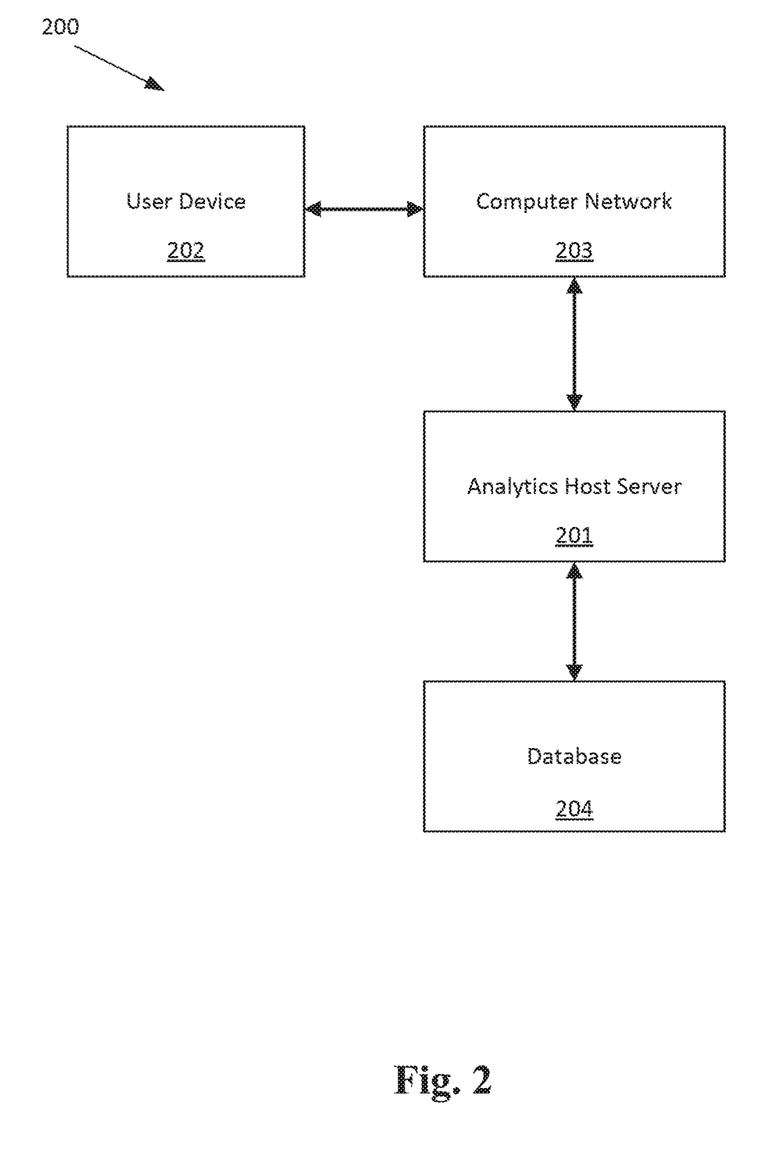
FIG. 2 shows an example system for analytics visualization according to an implementation of the disclosed subject matter.

FIG. 2 shows an example system for analytics visualization. A system 200 may include an analytics host server 201, a user device 202, database 203, and a computer network 204. Only one user device 202 is depicted in FIG. 2, although the system 200 may have more than one user device 202 operating at the same time.

The analytics host server 201 may be configured to host an explore mode for a CRM system, including a user interface, that may be accessible by, for example, the user device 202. The analytics host server 201 may create data subsets and visualizations for the data subsets, including visual links between visualizations for related data sets and data subsets. The analytics host server 201 may keep track of the visual links, and allow them to be an active element of the user interface presented on the user device. The analytics host server 201 may access the database 204 to analyze and present data that was previously stored in the database 204.

The user device 202 may be configured to provide input or receive output to and from and the analytics host server 201 in order to carry out one or more of the steps 101, 102, 103, and 104. The analytics host server 201 may include one or more server computers, computing devices, or other such computing systems. The analytics dashboard host server 201 may include any suitable software, hardware, and componentry, such as, for example, microprocessors, memory systems, input/output devices, device controllers and display systems. The analytics host server 201 may be a single server, or may be number of servers or other computing devise interconnected by suitable hardware and software systems and which collectively can perform any suitable functions of the analytics host server 201, such as, for example, the steps 101, 102, 103, and 104.

The database 204 may store data for analysis and display in the explore mode of the CRM system that includes the analytics host server 201. The data in the database 204 may include, for example, data gathered from monitoring social networking services, such as social media postings, and any other suitable information. The database 204 may be associated with the analytics host server 201. The database 204 may reside on the analytics host server 201, or may reside on a server or computing device remote from the analytics host server 201, provided that the remote server of computing device is capable of bi-directional data transfer with the analytics host server 201. A remote server or computing device on which the database 204 resides may be electronically connected to the analytics host server 201 and may be capable of continuous bi-directional data transfer with the analytics host server 201.

The database 204 may be a single database, or may include a number of databases connected by any suitable software and hardware and capable of performing the functions of the database 204. The database 204 may include a relational database architecture or other suitable database architecture. The database 204 may retrievably store information, documents, and data that is communicated to the database 204 from the user device 202, the analytics host server 201, or through the computer network 203.

Each component in the system 200 may communicate with other electronically coupled components through the network 203. The network 203 may include, for example, the Internet, a WAN, LAN, private network, public network, or any other type of computer network. The communication between any component and another computing device may be bidirectional. The user device 202 may include any type of device capable of accessing the analytics host server 201, for example, a smartphone, PDA, tablet, gaming system, personal computer, laptop, and cell phone.

Figure 3:
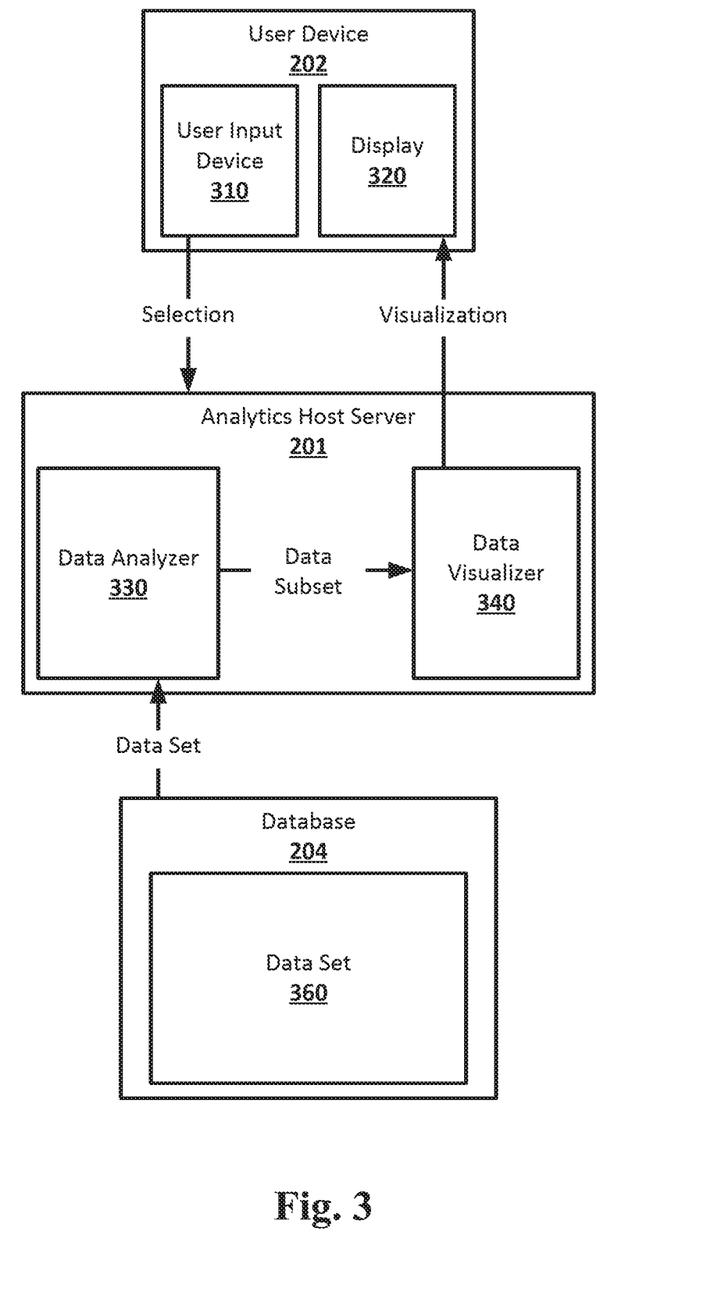
FIG. 3 shows an example system for analytics visualization according to an implementation of the disclosed subject matter.

FIG. 3 shows an example system for analytics visualization according to an implementation of the disclosed subject matter. The user device 202 may include a user input device 310 and a display 320. The user input device 310 may be any suitable device for allowing the user to interact with the user device 202, and may be, for example, a touchscreen, keyboard, mouse, trackball, or drawing pad. The user may use the user input device 310 to send a selection of a data set or data subset to the analytics host server 201, for example, as in step 101 and step 103.

The analytics host server 201 may include a data analyzer 330 and a data visualizer 340, which may both be any suitable combinations of hardware and software. The analytics hosts server 201 may retrieve the appropriate data set or from the data set 360 stored on the database 204. The data set 360 may include social media postings gathered by, for example, a CRM system of which the analytics host server 201 is a component. The data analyzer 330 may apply any suitable filters to the data set received from the database 204 to create a data subset, and the data visualizer 340 may display visualizations of the data subset on the display 320 of the user device 202, as in step 102 and step 104. For example, the analytics host server 201 may receive the entirety of the data set 360 from the database 204. The data analyzer 330 may not need to filter the data set 360, and the data visualizer 340 may display a visualization that includes a listing regarding the data in the data set 360, such as, for example, the total volume of social media postings included in the data set 360. The analytics host server 201 may then receive, for the user device 201, a selection of a data subset from the data set 360. For example, the user may select a number of filters to apply to the data set 360. The data analyzer 330 may extract the appropriate data from the data set 360 based on the filters selected by the user to create a data subset. The data visualizer 340 may display a visualization of the data subset on the display 320 of the user device 201, including a visual link between the visualization for the data subset and the visualization for the data set 360, for example, as in step 104.

Figure 4:
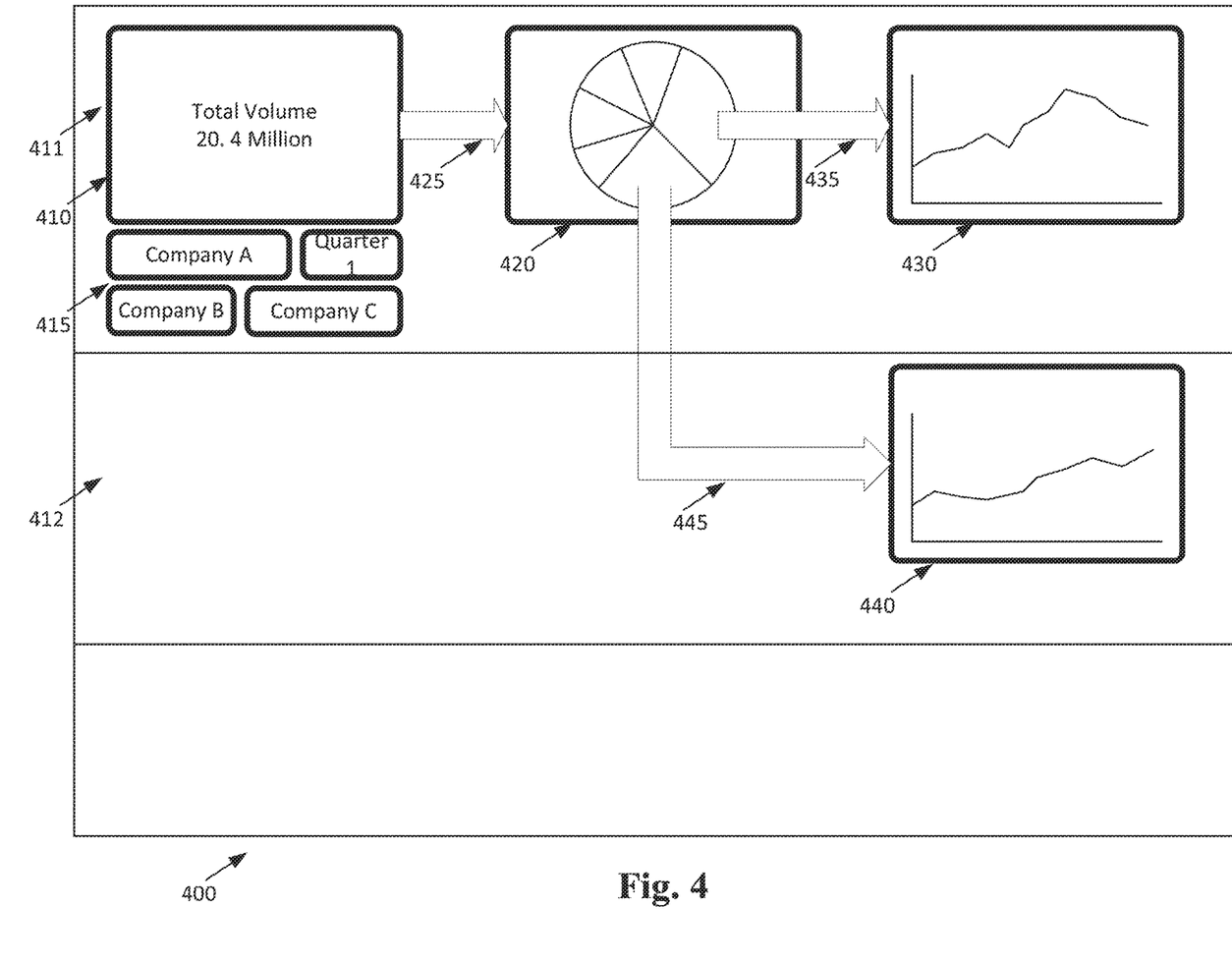
FIG. 4 shows example visualizations of a data set according to an implementation of the disclosed subject matter.

FIG. 4 shows example visualizations of a data set according to an implementation of the disclosed subject matter. The user interface 400 for the explore mode of the CRM system of which the analytics host server 201 is a component may be displayed on the display 320 of the user device 201. A first visualization 410 may be a visualization for the totality of the data set 360, and may, for example, include an indication of the total volume of the data in the data set 360. Filters 415 may be received from the user device 201 and may be applied to the data set 360 for the first visualization 410 to create a data subset. The data subset, which may be a child of the data set 360, may be visualized with the second visualization 420. The second visualization 420 may be linked to the first visualization 410 by first visual link 425, and the first visualization 410 may be the parent of the second visualization 420, which may be the child.

The user, using the user device 201, may select a data subset of the data subset for the second visualization 420. For example, the user may apply further filters to the data subset for the second visualization 420, creating a child data subset that may be displayed using the third visualization 430. A second visual link 435 may link the third visualization 430 with the second visualization 420. This may allow the user, viewing the user interface, to retrace back from the third visualization 430 to the first visualization 410 based on the first visual link 425 and second visual link 435.

The user, using the user device 201, may select a second data subset of the data subset for the second visualization 420. The second data subset of the data subset for the second visualization 420 may be displayed in a fourth visualization 440. The fourth visualization 440 may be linked to the second visualization 420 with a third visual link 445. This may allow the user, viewing the user interface, to retrace back from the fourth visualization 440 to the first visualization 410 based on the first visual link 425 and third visual link 445.

Branches 411 and 412 may be used to organize the user interface 400. For example, the first child visualization of a parent visualization may appear in the same branch as the parent visualization. For example, the third visualization 430 may appear in the branch 411 along with the second visualization 420. The second child visualization of a parent visualization may appear in a branch below the parent visualization. For example, the fourth visualization 440 may appear in the branch 412, below the branch 411 with the second visualization 420.

Figure 5:
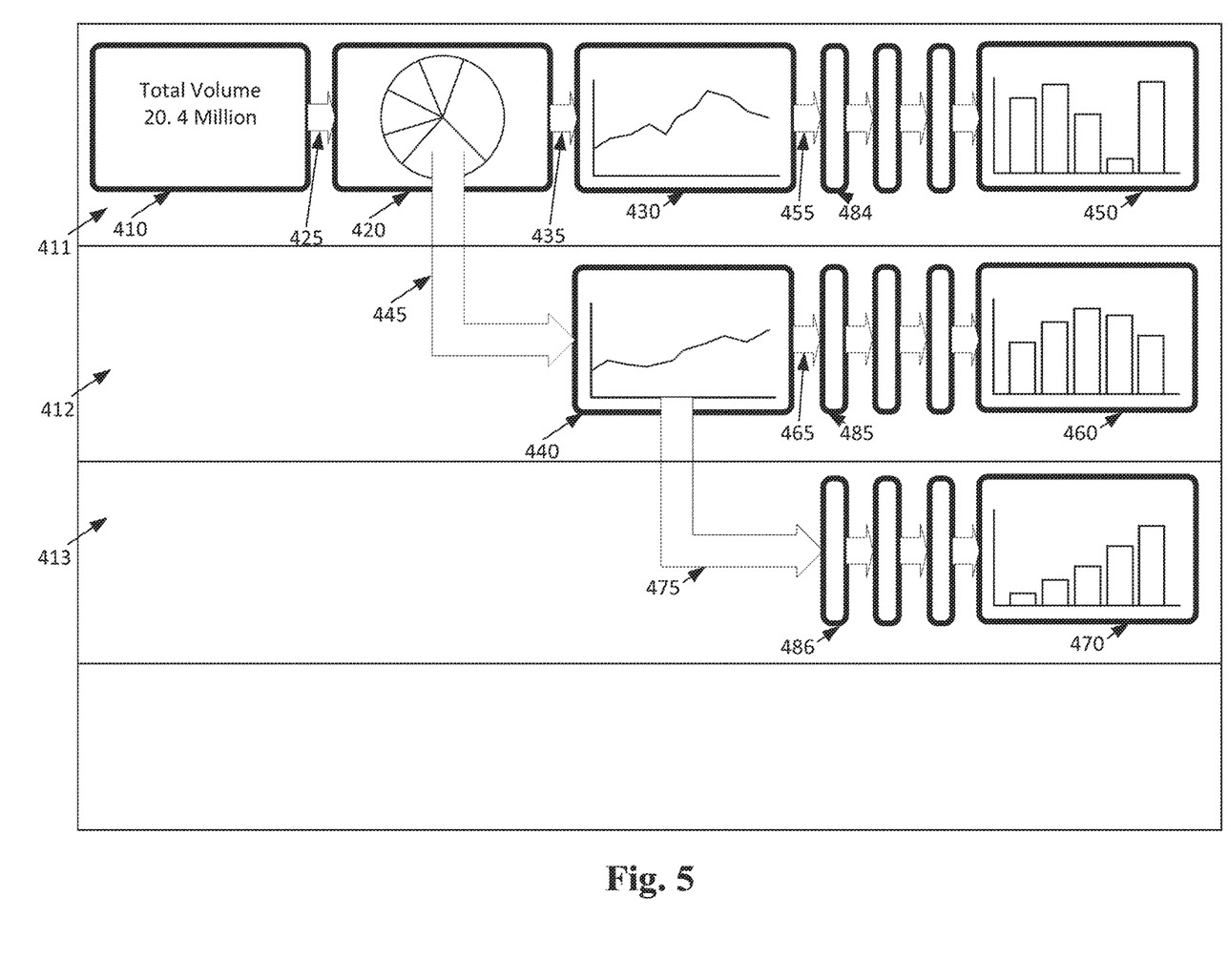
FIG. 5 shows example visualizations of a data set according to an implementation of the disclosed subject matter.

FIG. 5 shows example visualization of a data set according to an implementation of the disclosed subject matter. Any number of child visualizations may be created from a parent visualization, and any visualization may be used as a parent for a child visualization. For example, the user may continually apply filters to a data set, starting with the data set 360, in order to generate child visualizations using data subset with increasing levels of refinement. As the number of visualizations in a branch increases, certain visualizations may be collapsed on the user interface 400. For example, several generations of child visualizations may be created from the third visualization 430, starting with the data subset of the third visualization 430. The first generation visualization may be visually linked to the third visualization 430 with the visual link 455. Several of the descendant visualizations from the third visualization 430 may be collapsed in the collapsed area 484, with the last generation visualization 450 being displayed on the user interface 400. The last generation visualization 450 may be linked back to the second visualization 430 through the visual links in the collapsed area 484, the visual link 455, and the visual link 435. Similarly, the visualization 460 may be visually linked back to the second visualization 420 through the visual links in the collapsed area 485, the visual link 465, and the visual link 445.

The data subset for the fourth visualization 440 may be used to create additional data subsets. For example, the visualization 470 may be the last generation visualization for visualizations that are made from data subsets of the data subset for the fourth visualization 440. The visualization 470 may be displayed in a branch 413, and may be visually linked back to the fourth visualization 440 through the visual links in the collapsed area 486, and the visual link 475.

The visual links may be active or passive elements of the user interface 400, and may be created by the data visualizer 340 of the analytics host server 201 in response to selections received from the user device 202. The visual links may allow for a user to retrace their steps on the user interface 400 during infinite drill down and segmentation of the data set 360. For example, the user may select one of the displayed visualizations, such as the second visualization 420, and create a new data subset from the data subset used for the visualization 420 through the user interface 400. The data visualizer 340 may then create a visualization for the new data subset, and link the visualization, for example, the third visualization 430, to the second visualization 420, allowing the user to see the relationship between the visualizations.

Figure 6:
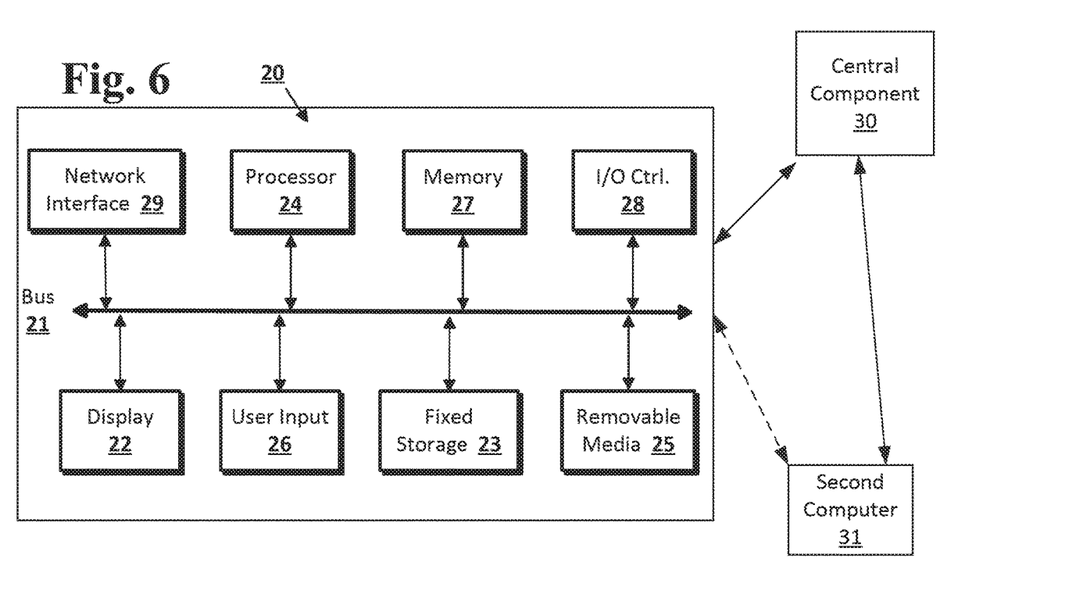
FIG. 6 shows a computer according to an implementation of the disclosed subject matter.

Implementations of the presently disclosed subject matter may be implemented in and used with a variety of component and network architectures. FIG. 6 is an example computer 20 suitable for implementing implementations of the presently disclosed subject matter. As discussed in further detail herein, the computer 20 may be a single computer in a network of multiple computers. As shown in FIG. 6, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 7.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
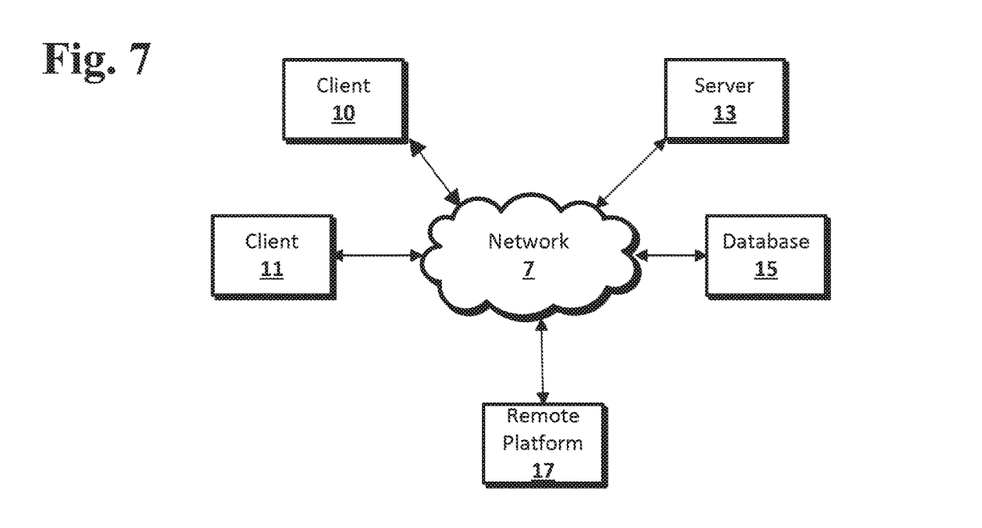
FIG. 7 shows a network configuration according to an implementation of the disclosed subject matter.

FIG. 7 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   generating a first visualization associated with a data set to be displayed on a user device;
   generating a second visualization associated with a first data subset of the data set to be displayed on the user device, the second visualization visually linked to the first visualization with a first visual link;
   generating a third visualization associated with a second data subset of the data set, the third visualization visually linked to the first visualization with a second visual link and to be displayed simultaneously with the second visualization on the user device;
   determining that data in the data set has changed;
   changing the first data subset based on changes to the data set;
   changing the second data subset based on changes to the first data subset;
   updating the second visualization based on the changing of the first data subset; and
   updating the third visualization based on the changing of the second data subset.

2. The computer-implemented method of claim 1, further comprising:
   generating the second visualization and the third visualization to be displayed in separate branches on the user device.

3. The computer-implemented method of claim 1, further comprising:
   collapsing one or more visualizations for one or more data subsets and one or more visual links displayed on the user device, wherein each of the one or more visualizations is in the same branch.

4. The computer-implemented method of claim 1, wherein the visual link is an active element of a user interface displayed on the display of the user device.

5. The computer-implemented method of claim 1, wherein the data set comprises at least one social media posting.

6. The computer-implemented method of claim 1, wherein the second visualization is a bar graph, a pie chart, a line graph, or a data listing.

7. The computer-implemented method of claim 1, wherein the first data subset of the data set is based on applying at least one filter to the data set.

8. A system comprising:
   a database, the database configured to store a data set;
   a user device comprising a display configured to display a user interface; and
   an analytics host server, the analytics host server electronically coupled to the database and configured to:
   generate a first visualization associated with the data set to be displayed on the display of the user device;
   generate a second visualization associated with a first data subset of the data set to be displayed on the display of the user device, the second visualization visually linked to the first visualization with a first visual link;
   generate a third visualization associated with a second data subset of the data set, the third visualization visually linked to the first visualization with a second visual link and to be displayed simultaneously with the second visualization on the user device;
   determine that data in the data set has changed;
   change the first data subset based on changes to the data set;
   change the second data subset based on changes to the first data subset;
   update the second visualization based on the changing of the first data subset; and
   update the third visualization based on the changing of the second data subset.

9. The system of claim 8, wherein the analytics host server is further configured to generate the second visualization and the third visualization to be displayed in separate branches on the user device.

10. The system of claim 8, wherein the analytics host server is further configured to collapse one or more visualizations for one or more data subsets and one or more visual links displayed on the user device, wherein each of the one or more visualizations is in the same branch.

11. The system of claim 8, wherein the visual link is an active element of a user interface displayed on the display of the user device.

12. The system of claim 8, wherein the data set comprises at least one social media posting.

13. The system of claim 8, wherein the second visualization is a bar graph, a pie chart, a line graph, or a data listing.

14. The system of claim 8, wherein the first data subset of the data set is based on applying at least one filter to the data set.

15. A system comprising: one or more computers and one or more storage devices storing instructions which are operable, when executed by the one or more computers, to cause the one or more computers to perform operations comprising:
   generating a first visualization associated with a data set to be displayed on a user device;
   generating a second visualization associated with a first data subset of the data set to be displayed on the user device, the second visualization visually linked to the first visualization with a first visual link;
   generating a third visualization associated with a second data subset of the data set, the third visualization visually linked to the first visualization with a second visual link and to be displayed simultaneously with the second visualization on the user device;
   determining that data in the data set has changed;
   changing the first data subset based on changes to the data set;
   changing the second data subset based on changes to the first data subset;
   updating the second visualization based on the changing of the first data subset; and
   updating the third visualization based on the changing of the second data subset.

16. The system of claim 15, wherein the instructions further cause the one or more computers to perform operations comprising:
   generating the second visualization and the third visualization to be displayed in separate branches on the user device.

17. The system of claim 15, wherein the instructions further cause the one or more computers to perform operations comprising:
   collapsing one or more visualizations for one or more data subsets and one or more visual links displayed on the user device, wherein each of the one or more visualizations is in the same branch.

* * * * *